(12) United States Patent
Solarz (10) Patent No.: US 10,711,904 B2
(45) Date of Patent: Jul. 14, 2020

(54) CHECK VALVES

(71) Applicant: Hamilton Sundstrand Corporation, Charlotte, NC (US)

(72) Inventor: Bartosz Solarz, Wroclaw (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/191,678

(22) Filed: Nov. 15, 2018

(65) Prior Publication Data
US 2019/0178400 A1 Jun. 13, 2019

(30) Foreign Application Priority Data
Dec. 11, 2017 (EP) ...................................... 17206552

(51) Int. Cl.
*F16K 15/03* (2006.01)
*F16K 47/02* (2006.01)

(52) U.S. Cl.
CPC .......... *F16K 15/036* (2013.01); *F16K 47/023* (2013.01)

(58) Field of Classification Search
CPC .............................. F16K 15/036; F16K 47/023
USPC ................................................. 137/512, 512.1
See application file for complete search history.

(56) References Cited

U.S. PATENT DOCUMENTS

| | | | |
|---|---|---|---|
| 4,178,638 A | 12/1979 | Meyer | |
| RE32,362 E * | 2/1987 | McCabe | A62C 2/14 137/15.25 |
| 8,181,669 B2 | 5/2012 | Dehais et al. | |
| 2013/0340862 A1 | 12/2013 | Kamp | |
| 2014/0202562 A1* | 7/2014 | Kamp | F16K 47/00 137/512.1 |
| 2016/0146362 A1 | 5/2016 | Solarz | |
| 2017/0268696 A1 | 9/2017 | Lesniewski | |

FOREIGN PATENT DOCUMENTS

GB 1913404347 A 2/1914

OTHER PUBLICATIONS

Extended European Search Report for International Application No. 17206552.6 dated Jun. 14, 2018, 5 pages.

* cited by examiner

*Primary Examiner* — P. Macade Nichols
(74) *Attorney, Agent, or Firm* — Cantor Colburn LLP (57) ABSTRACT

A check valve comprises a valve housing defining at least one valve opening, and at least one flapper pivotably mounted for rotation relative to the valve housing between an open position in which it permits fluid flow through the respective valve opening and a closed position in which it prevents fluid flow through the valve opening. The valve housing comprises a hinge body which comprising a hinge groove extending in a straight line in a longitudinal direction therethrough from a first end to a second end. The hinge groove has, in a plane transverse to the longitudinal direction, an arcuate profile. The at least one flapper comprises a hinge tongue formed along a proximal edge thereof. The hinge tongue extends in a straight line in a longitudinal direction along the proximal edge of the flapper from a first end to a second end.

14 Claims, 7 Drawing Sheets

CHECK VALVES

FOREIGN PRIORITY

This application claims priority to European Patent Application No. 17206552.6 filed Dec. 11, 2017, the entire contents of which is incorporated herein by reference.

TECHNICAL FIELD

The present disclosure relates to check valves.

BACKGROUND

Check valves are valves that allow fluid flow in one direction therethrough and prevent flow in the opposite direction. They are widely used in a range of applications, for example in air conditioning systems, for example in aircraft air conditioning systems.

Check valves commonly include at least one, typically a pair of, valve flappers located at an opening in a valve housing. The flappers are hingedly supported on a hinge pin mounted to the valve housing for rotation between a closed position in which they lie across and close the opening, preventing fluid flow through the opening in one direction and an open position in which, under the pressure of a fluid (gas or liquid) on one side of the check valve, the flappers rotate from their closed positions so as to allow the fluid to flow through the valve in the opposite direction. The flappers typically have hinge lugs which engage over the hinge pin. Discontinuities in the flapper between the hinge lugs may in some cases lead to stress concentrations in the flappers.

A stop is provided to limit the rotational movement of the flapper elements as they open. The stop may comprise a stop pin which is mounted to posts arranged on opposed sides of the valve housing opening. In other embodiments, a more substantial stop may be provided, extending across the valve opening, providing a larger contact area with the flappers. An example of such a stop is disclosed in US 2013/340862 A1. This may help the stop better absorb the impact of the flappers as they engage the stop. However, such stops may be difficult to manufacture, often requiring complex machining from a large block of material.

The present disclosure provides a check valve with a different hinge and stop arrangement.

SUMMARY

In accordance with this disclosure there is provided a check valve comprising a valve housing defining at least one valve opening, and at least one flapper pivotably mounted for rotation relative to the valve housing between an open position in which it permits fluid flow through the respective valve opening and a closed position in which it prevents fluid flow through the valve opening. The valve housing comprises a hinge body which comprising a hinge groove extending in a straight line in a longitudinal direction therethrough from a first end to a second end. The hinge groove has, in a plane transverse to the longitudinal direction, an arcuate profile. The at least one flapper comprises a hinge tongue formed along a proximal edge thereof. The hinge tongue extends in a straight line in a longitudinal direction along the proximal edge of the flapper from a first end to a second end. The hinge tongue has, in a plane transverse to the longitudinal direction, an arcuate profile which is complementary to that of the hinge groove. The hinge tongue is received within the hinge groove and is rotatable therein to allow the flapper to rotate between its open position and its closed position.

In embodiments of the disclosure, the valve housing may comprise a pair of valve openings and the valve comprises a pair of flappers each flapper associated with a respective valve opening. The hinge body may be located between the valve openings.

In embodiments of the disclosure, the hinge body may further comprise at least one stop element projecting therefrom in a direction away from the valve opening, the flapper (engaging the stop element in its open position.

In some embodiments the hinge body may comprises a pair of stop elements projecting therefrom, the stop elements diverging from one another in the direction away from the valve opening.

In some embodiments the stop element or elements may be planar elements.

In some embodiments, openings may be through the stop element(s).

In embodiments of the disclosure the hinge body may be formed integrally with the valve housing. In other embodiments, it may be formed separately therefrom and mounted thereto.

In certain embodiments of the disclosure, the valve body and/or the flapper are extruded.

In embodiments of the disclosure the check valve may further comprise retaining elements mounted at the first and second ends of the hinge body to retain the hinge tongue in the hinge groove.

In embodiments of the disclosure, the hinge groove and hinge tongue may be are configured such that a clearance is provided between an end of the flapper hinge tongue and an end surface of the hinge groove when the hinge tongue is in a closed position.

In embodiments of the disclosure, the hinge groove may be enlarged at an or the end relative to the width (W) of a remainder of the hinge groove.

The disclosure also extends to a method of manufacturing a check valve housing for a check valve in accordance with the disclosure. The method includes extruding a single element having a base portion for forming the at least one valve opening therein and a hinge portion extending therefrom for forming the hinge body and containing the hinge groove and forming the at least one valve opening through the base portion.

The disclosure also extends to a method of manufacturing a check valve housing for a check valve in accordance with the disclosure, comprising forming a first, valve housing base portion and a second, hinge body portion separately and assembling the hinge body portion to the valve housing base portion. The at least one valve opening may be formed through the first portion.

In certain embodiments of the disclosure, the method may comprise machining the hinge groove into the hinge body, for example using wire EDM.

The disclosure also extends to a method of manufacturing a flapper for a check valve in accordance with the disclosure. The method includes extruding the flapper with the hinge tongue formed therein.

The method of manufacturing a check valve housing or a flapper as above may include machining the valve housing and/or the flapper to a final shape.

The disclosure also extends to a method of manufacturing a check valve, comprising manufacturing a check valve housing by a method as discussed above, manufacturing a flapper by a method as discussed above, and assembling the flapper to the hinge body.

DETAILED DESCRIPTION

Figure 1:
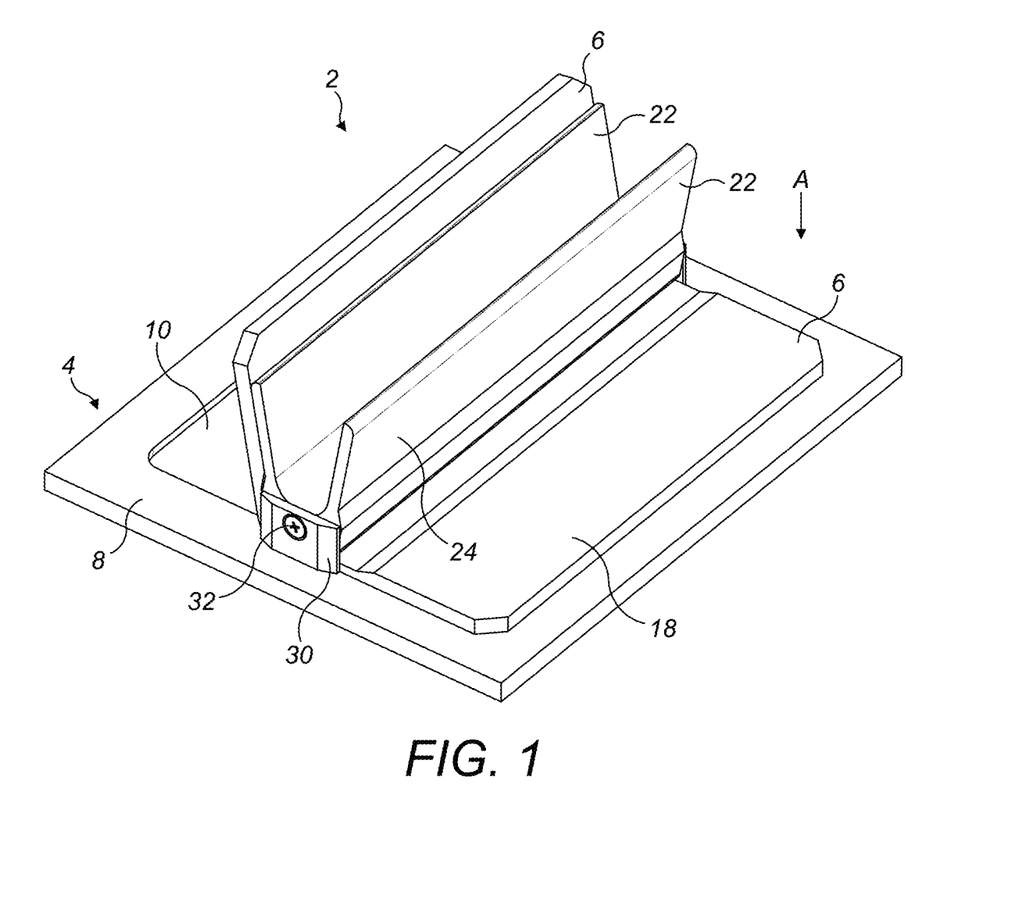
FIG. 1 shows, in a perspective view, a first embodiment of check valve in accordance with the disclosure.
Figure 2:
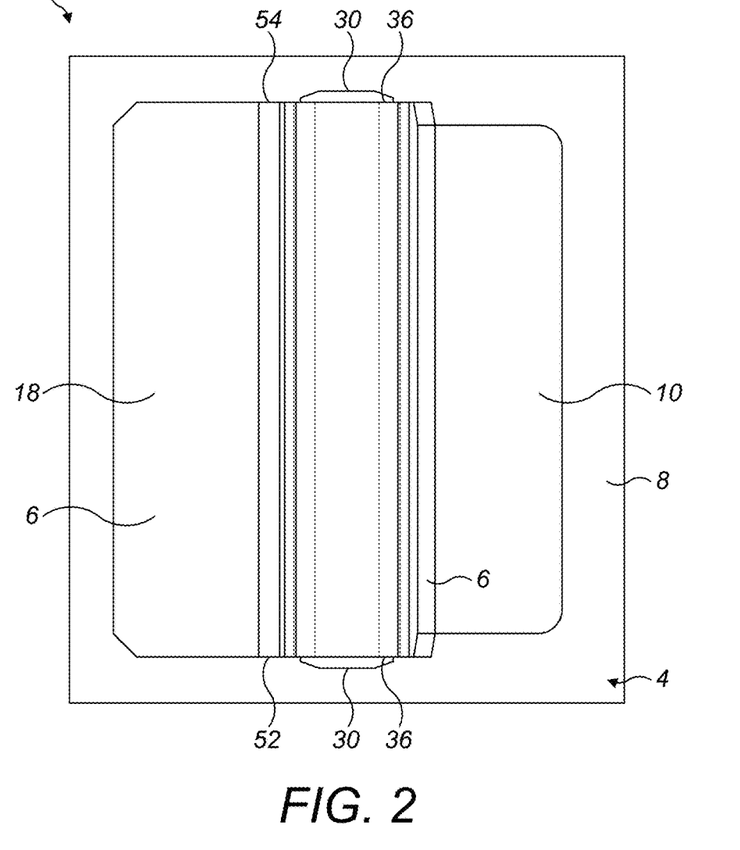
FIG. 2 shows a plan view of the check valve of FIG. 1.
Figure 3:
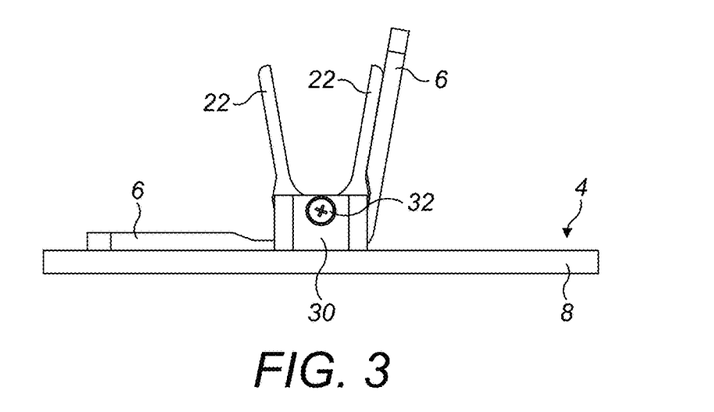
FIG. 3 shows a side elevation view of the check valve of FIG. 1.

A first embodiment of a check valve 2 in accordance with this disclosure is illustrated in FIGS. 1 to 3.

The check valve 2 comprises a valve housing 4 and a pair of flappers 6. The valve housing 4 in use may be mounted in a pipe, duct or the like. The external profile of the valve housing 4 may therefore be chosen to fit into a particular shape or duct. In this embodiment, the external profile is generally rectangular.

The valve housing 4 comprises a generally planar base portion 8 in which is defined a pair of generally rectangular valve openings 10 which are separated by a central web of the valve housing 4. A hinge body 12 extends from the central web 10 in a direction away from the valve openings 10. As will be described in further detail below, with reference to FIGS. 4 and 5, the hinge body 12 comprises a pair of hinge grooves 14 for mounting the flappers 6.

Figure 4:
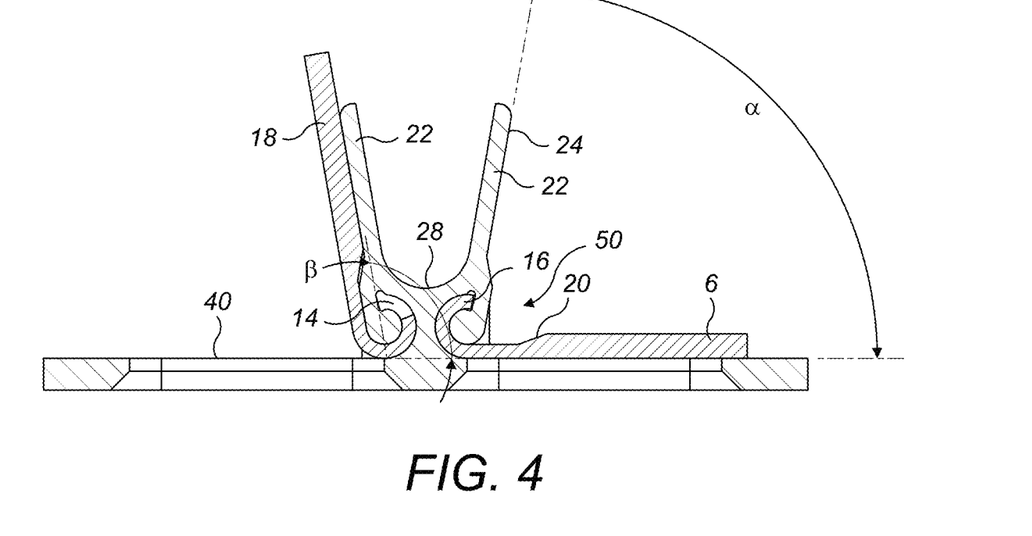
FIG. 4 shows an enlarged side elevation of the check valve of FIG. 2.
Figure 5:
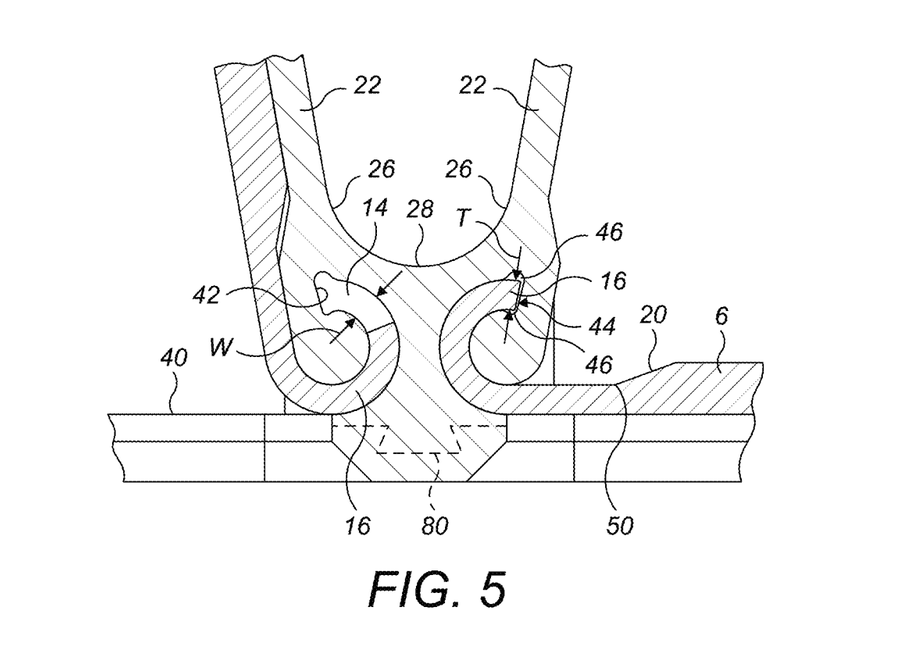
FIG. 5 shows a detail of FIG. 4.

The flappers 6 are mounted to the hinge body 12 of the valve housing 4 by means of respective hinge tongues 16 received within the hinge grooves 14 (see FIGS. 4 and 5). The flappers 6 are shaped such that when they are in the closed position, they will cover the valve openings 10 and will not permit flow through the valve openings (in the direction A of FIG. 1). In this embodiment, therefore, the flappers 6 each have a generally rectangular body portion 18 which in the closed position extends beyond and closes the associated valve opening 10. The flapper 6 may have a stepped configuration with, as shown, a step, for example an angled step 20 provided between the body portion 18 and the hinge tongue 16.

A pair of opposed stop elements 22 extend from the hinge body 12 in a direction away from the valve openings 10. The stop elements 22 in this embodiment are formed as generally planar elements. The outwardly facing surface 24 of each stop element 22 may, as shown, have a shape which is generally complementary to the shape of the opposed surface of the body portion 18 of the flapper 6. Thus in this embodiment, the stop elements 20 also have a stepped configuration, similar to that of the body portion 18 of the flapper 6.

The outer surfaces 24 of the stop elements 22 each extend at an angle α relative to the plane A of the valve housing 4. Accordingly, the stop elements 22 diverge from one another in the direction away from the valve openings 10. Ideally, the angle α should be as near to 90 degrees as possible, to allow maximum opening of the flappers 6. However, due to structural considerations, this angle will generally be lower than 90 degrees, for example up to 85 degrees, for example up to 80 degrees.

The stop elements 22 are arranged such that when the flappers 6 open, the body portions 18 of the flappers 6 engage face to face with the outwardly facing surface 24 of the stop elements 22. This will dissipate the impact of the flappers 6 on the stop elements 22 over a larger area.

The stop elements 22 are each connected to the hinge body 12 through a smooth transition or fillet 26, so as to mitigate stress concentrations at the interface between the stop elements 22 and hinge body 12. As illustrated, in one embodiment, the fillets 26 may coalesce to form an arcuate, for example generally semi-circular surface 28.

As can be seen from FIGS. 1 to 3, the flappers 6 are retained in the valve housing 4 by retaining elements 30 such as retaining plates 30. The retaining plates 30 may be secured to the ends of the hinge body 12 by a suitable fastener 32, for example a screw fastener 32.

The hinge mechanism between the valve housing 4 and the flappers 6 will now be described in greater detail, again referring primarily to FIGS. 4 and 5.

As discussed above, the hinge body 12 on the valve housing 4 comprises a hinge groove 14. The hinge groove 14 extends in a straight line in a longitudinal direction through the hinge body from a first end 34 to a second end 36. The hinge groove 14 has an arcuate, circular profile in a plane perpendicular to the longitudinal direction. The profile remains the same along the longitudinal length of the hinge groove 14.

The hinge groove 14 extends tangentially from an upper surface 40 of the valve housing over an angular arc β. In this embodiment, the angle β is approximately 100 degrees. The angular extent of the hinge groove 14 should be such as to allow the flapper 6 to rotate in the hinge groove 14 without the hinge tongue 16 striking the end 42 of the hinge groove 14 when the flapper 6 is in a closed position. A small clearance 44 is therefore provided between the end 42 of the hinge groove 14 and the hinge tongue 16 in that position, as can best be seen in FIG. 5.

The hinge groove 14 has, over a majority of its length a constant width W, although the end 42 of the hinge groove 14 may be enlarged, as shown. This may be advantageous in certain embodiments as it may allow any contaminants which enter the hinge groove 14, or debris due to wear of the hinge mechanism to accumulate without preventing full closure of the flapper 6.

Thus, in the embodiment illustrated, pockets 46 are formed on both sides of the hinge groove width W, although in other embodiments a pocket 46 may be provided on just one side, for example. The pockets 46 may be symmetrical or asymmetrical relative to the axis of the hinge groove 14. The pockets 46 extend along the entire length of the hinge groove 14.

In practice, the clearance 44 and the enlargement of the hinge groove end 42 may be chosen to ensure that the hinge tongue 16 does not engage the hinge groove end 42.

Turning now to the flapper hinge tongue 16, this is formed along a proximal edge 50 of the flapper. The hinge tongue 16 extends in a straight line in a longitudinal direction along the proximal edge 50 of the flapper 6 from a first end 52 to a second end 54. The hinge tongue 16 has, in a plane perpendicular to the longitudinal direction, an arcuate, circular profile which is complementary to that of the hinge groove 14. The profile is the same along the longitudinal length of the hinge tongue 16.

The hinge tongue 16 extends tangentially from the flapper body portion 18. The hinge tongue 16 has a thickness T which is slightly smaller than the width W of the hinge groove 14 such that the hinge tongue 16 is received with a sliding fit within the hinge groove 14. The arcuate extent of the hinge tongue 16 is such that in the closed position of the flapper 6, the hinge tongue 16 does not contact the end 42 of the hinge groove 14.

It will be seen from the above that the above description that a check valve 2 in accordance with embodiments of this disclosure has a radically different construction from that of traditional check valves. The use of a hinge pin is avoided, leading to fewer parts in assembly. Also, the longitudinally continuous nature of the hinge groove 14 and hinge tongue 16 avoids longitudinal discontinuities between the hinge components and the associated flapper 6 or valve housing 4. This may reduce stresses in the valve 2, thereby mitigating cracking of valve components. Also, due to the increased surface area between the two parts of the hinge compared to a traditional valve construction, wear of the hinge may be reduced. These mean that the service life of the valve 2 may be increased.

The nature of the hinge construction also permits different manufacturing techniques to be employed, compared to those used in traditional check valves.

Figure 6:
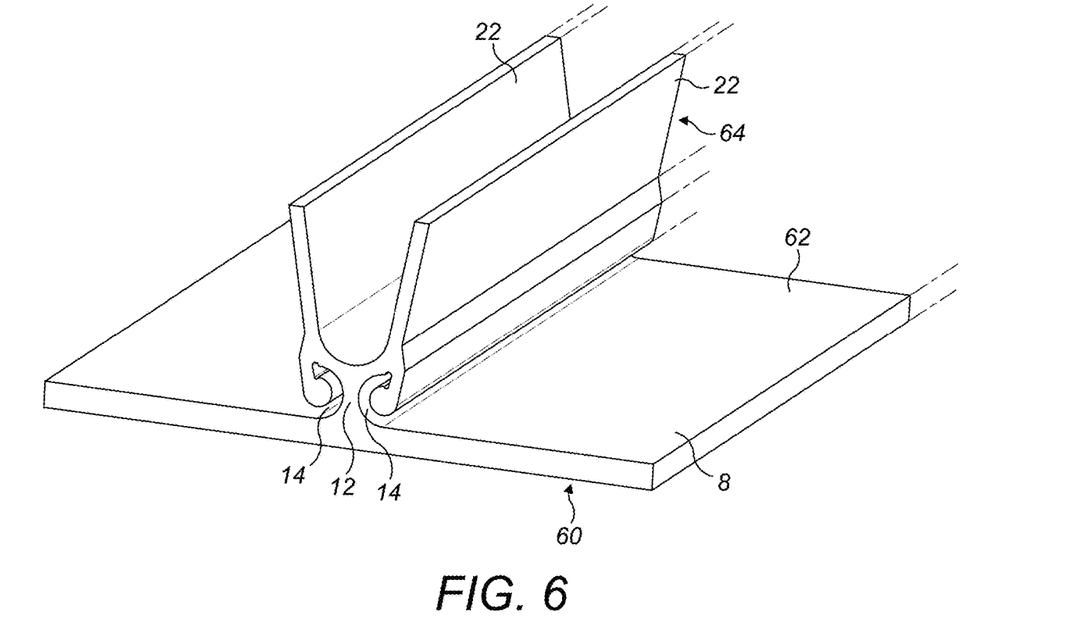
FIG. 6 shows an extrusion used for manufacturing a valve housing of embodiments of the disclosure.
Figure 7:
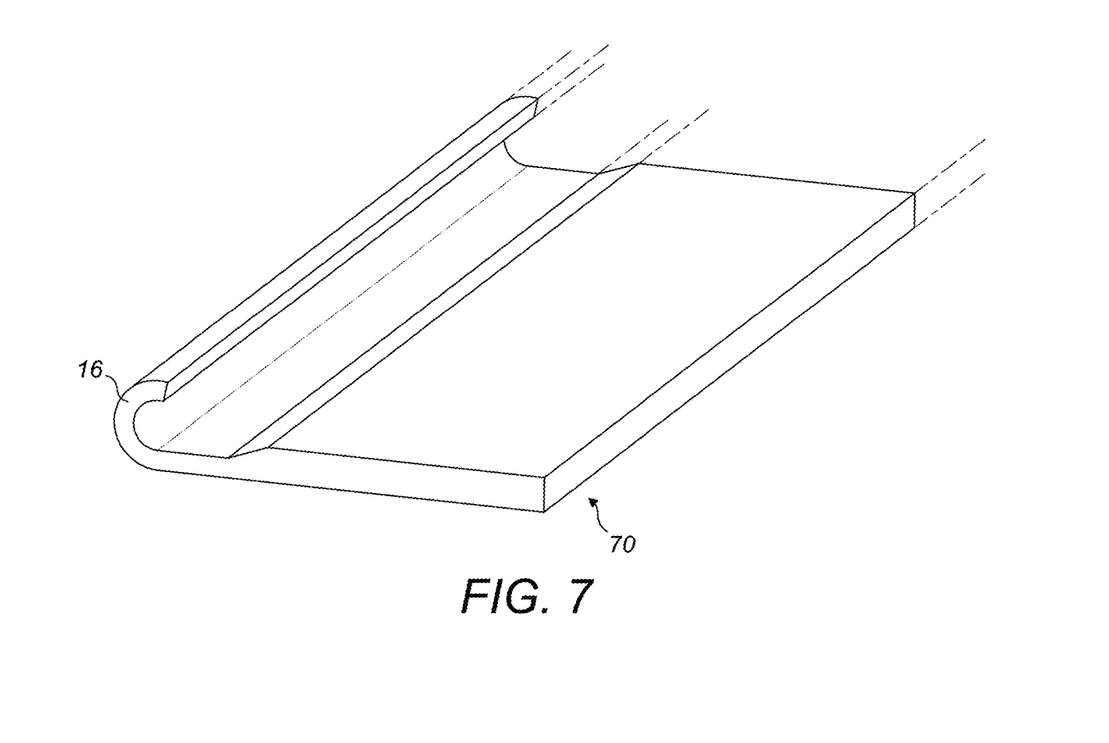
FIG. 7 shows an extrusion for manufacturing a flapper of embodiments of this disclosure.

As the hinge groove 14 and hinge tongue 16 have profiles which remain the same along their length, the valve housing 4 and/or the flappers 6 may be extruded. FIGS. 6 and 7 show a valve housing extrusion 60 and a flapper extrusion 70 respectively. A plurality of valve housings 4 and flappers 6 can be made from single valve housing extrusions 60 and flapper extrusions 70, the extrusion simply being cut to an appropriate length. The profiles of the hinge groove 14 and the hinge tongue 16 are accurately defined in the extrusions 60, 70. This provides a particularly simple and cost effective way of producing the valve elements.

The valve housing extrusion 60 has a base portion 62 through which the valve openings will eventually be formed and a hinge body portion 64.

Once cut to length, the valve housing extrusion 60 may be machined to define features of the valve housing 4, such as the valve openings 10, the desired peripheral profile of the valve housing 4 and the desired shape of the stop members 22 and so on. Similarly, the flapper extrusion 70 may be machined to produce a desired flapper shape, for example, depending on the shape of the valve openings 10.

Once machined, the valve housing 4 and flappers 6 may be very simply assembled by sliding the hinge tongues 16 of the flappers 6 into the hinge grooves 14 of the valve housing 4. The flappers 6 may then be retained in the valve housing 4 by the attachment of retaining elements 30 as discussed above. However, that may not be necessary in all cases as the flappers 6 may for example be retained in use by the walls of the duct in which the check valve 2 is mounted.

In the embodiment of FIG. 6, the hinge body 12 and stop members are shown as being unitary with the base plate of the valve housing 4. However, in other embodiments, they may be made as separate components and joined together. For example, in one embodiment, the hinge body 12 and stop elements 20 may be extruded as a single component and then attached to a separate base plate 10. The attachment to the base plate 10 could be a sliding attachment, such as a dovetail attachment 80 as illustrated schematically in FIG. 5. This arrangement would still have the significant benefit of being able to produce the hinge profiles by extrusion.

Of course, the formation of the hinge groove 14 is not limited to it being extruded. There may be situations in which, for example due to the nature of the material of the valve body 4, the profiles cannot be extruded. In those circumstances, the hinge groove 14 may be machined, for example using electro-discharge machining (EDM). In particular, wire EDM processes would be particularly suited to producing the requisite hinge groove profiles.

It will be appreciated that the embodiment described in FIGS. 1 to 3 is simply one example of a check valve 2 falling within the scope of the disclosure. A further embodiment is illustrated in FIGS. 8 to 10.

Figure 8:
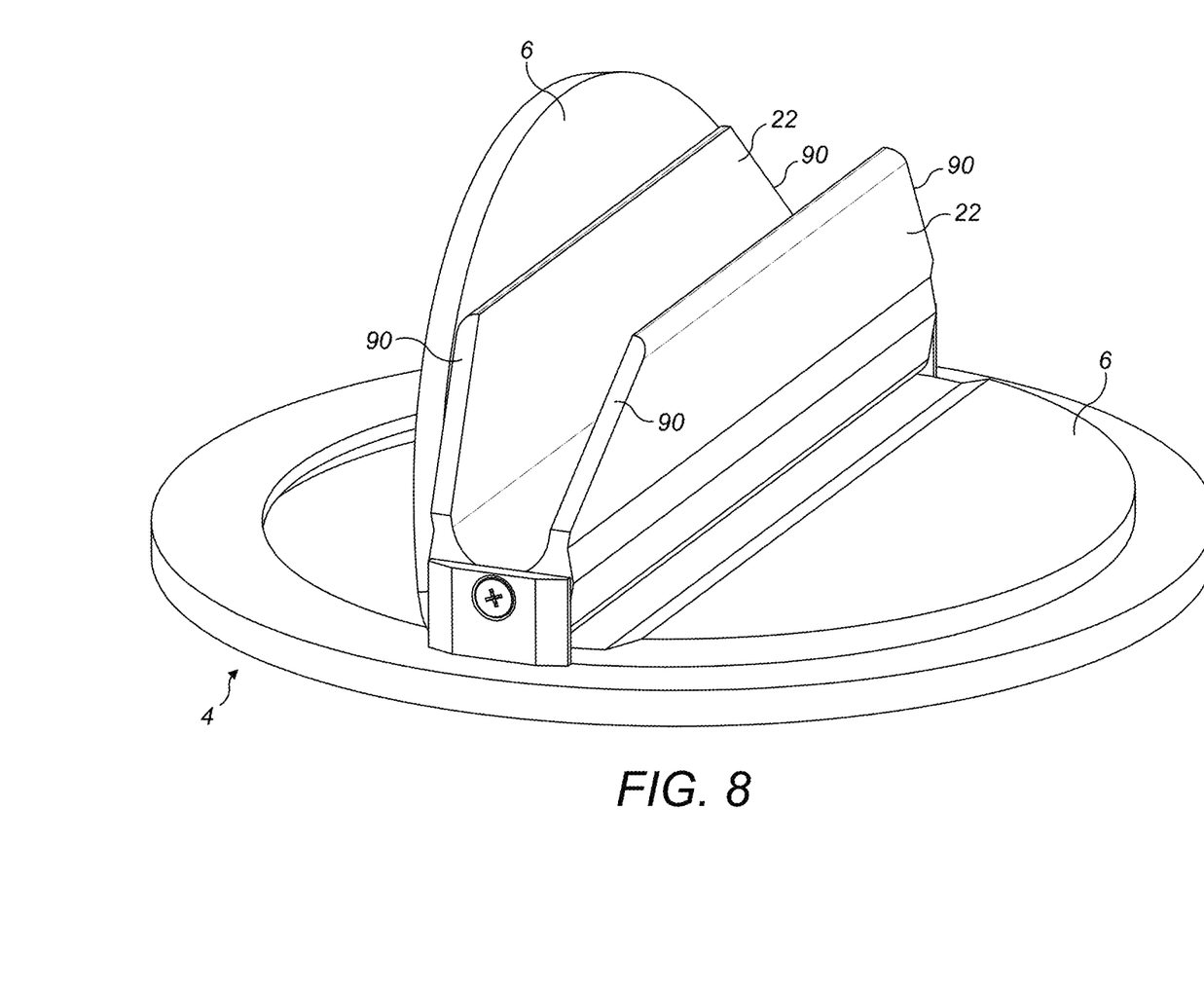
FIG. 8 shows, in a perspective view, a second embodiment of check valve in accordance with this disclosure.
Figure 9:
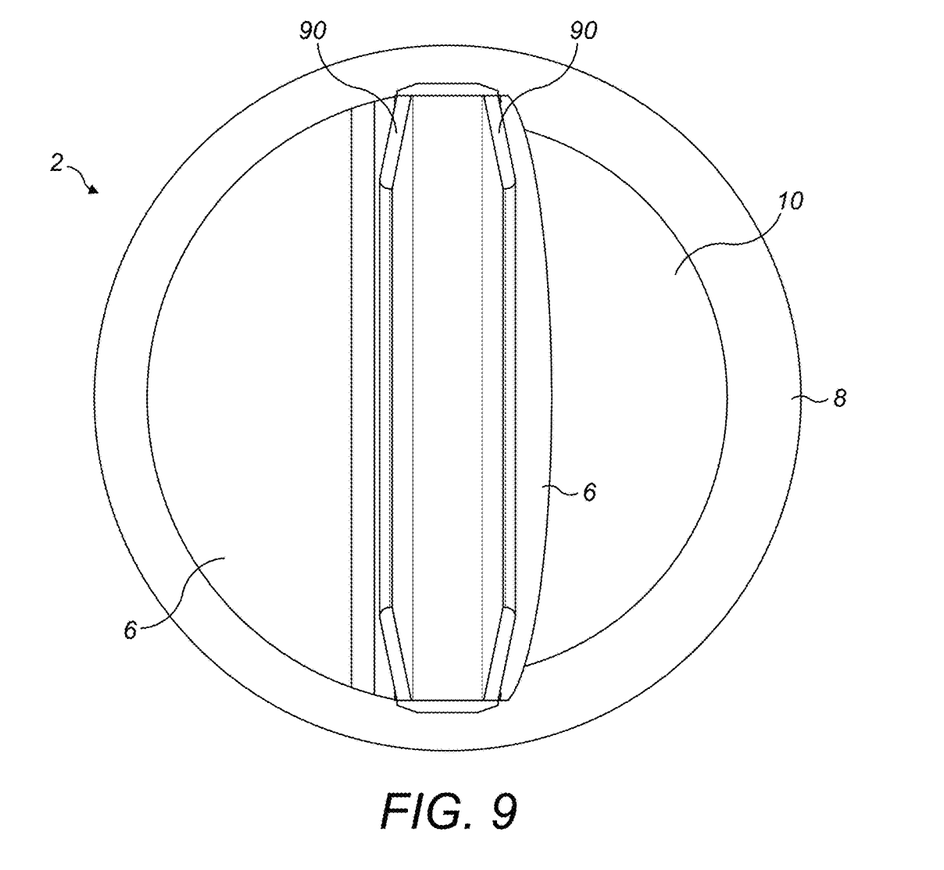
FIG. 9 shows a plan view of the check valve of FIG. 8.
Figure 10:
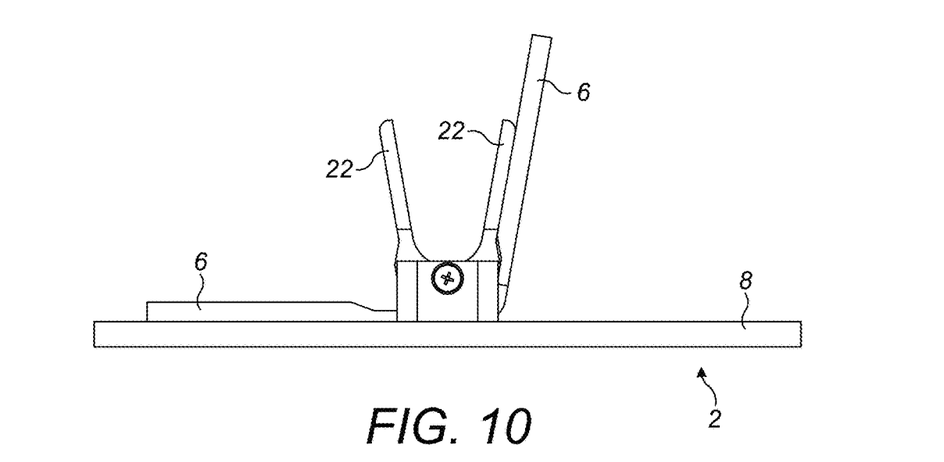
FIG. 10 shows a side elevation view of the check valve of FIG. 8.

The basic structure of the check valve 2 illustrated in FIGS. 8 to 10 is the same as that of the earlier embodiment. However, the shape of the check valve is different. In this embodiment, the base portion 8 of the valve housing 4 has a circular external profile, more appropriate for mounting within a circular section duct. The valve openings 10 and flappers 6 are therefore generally semi-circular or D-shaped. In addition, the stop elements 22 have angled ends 90 to allow them to fit within the relevant duct. The hinge construction is the same as that of the first embodiment, and the valve 2 may also be made in a similar manner to the first embodiment.

Figure 11:
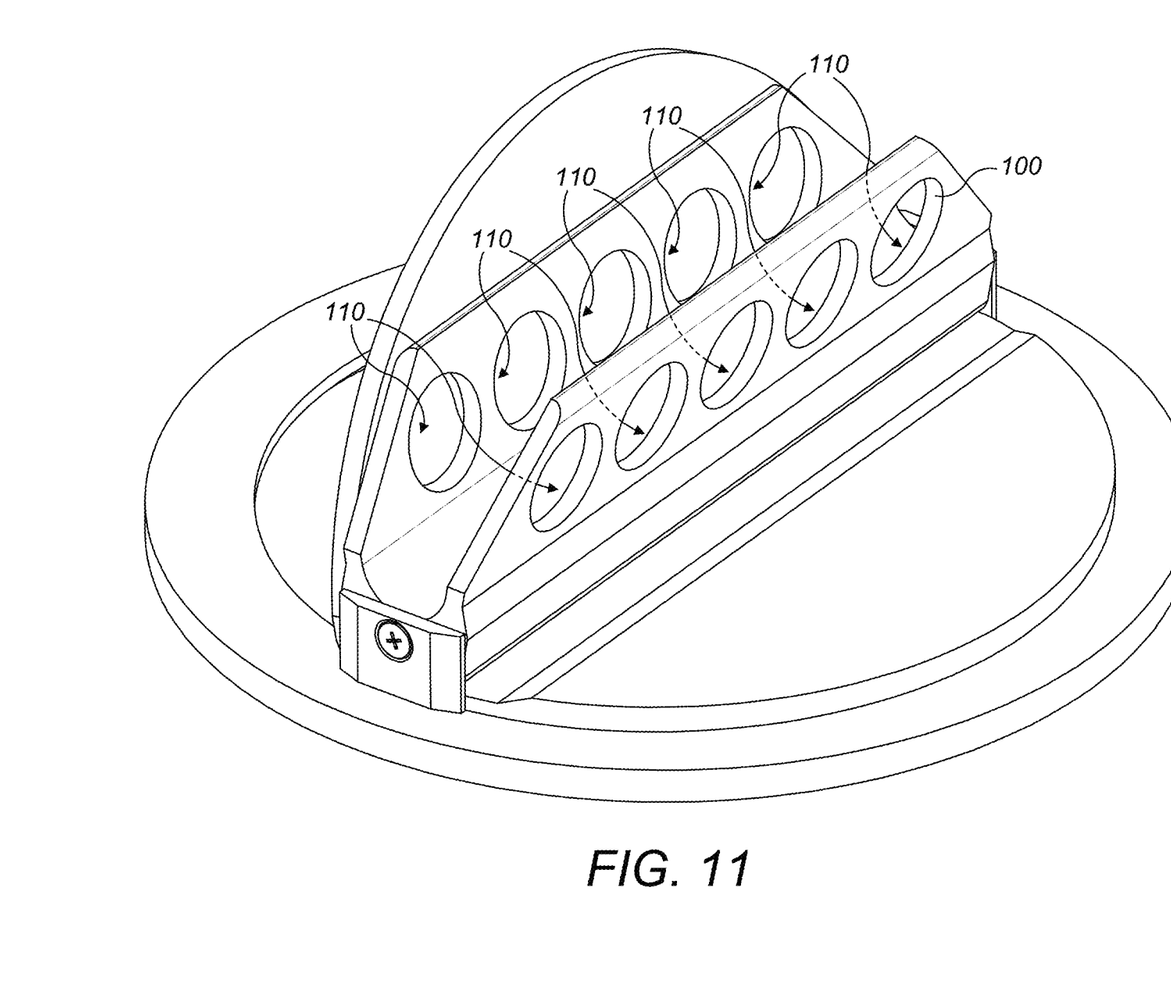
FIG. 11 illustrates a modification to the check valve of FIG. 8.

The stop elements 20 may also be easily modified in accordance with the disclosure. Whilst shown as continuous planar elements in the embodiments of FIGS. 1 to 3 and 8 to 10, they may be provided with one or more openings 100 therethrough as illustrated in FIG. 11. The openings 100 may be formed in any suitable manner, for example drilling. The openings 100 may have the advantage of reducing the weight of the check valve 2, which is of particular importance in aerospace applications. They may also have the advantage of allowing air 110 to access a larger area of the flappers 6 when closing the valve 2, as illustrated schematically in FIG. 11. This will allow the valve to close more quickly.

It will thus be seen that embodiments of the disclosure may provide significant advantages in terms of ease of manufacture and assembly of check valves and improved service life.

Whilst specific embodiments of the disclosure have been described, it will be apparent that modifications may be made to the embodiments without departing from the scope of the disclosure. For example, while a check valve 2 having two flappers 6 is disclosed, the disclosure would also extend to a check valve having just a single flapper.

The invention claimed is:

1. A check valve comprising:
   a valve housing defining at least one valve opening; and
   at least one flapper pivotably mounted for rotation relative to the valve housing between an open position in which it permits fluid flow through the respective valve opening and a closed position in which it prevents fluid flow through the valve opening;
   the valve housing comprising a hinge body, the hinge body comprising a hinge groove extending in a straight line in a longitudinal direction therethrough from a first end to a second end, the hinge groove having, in a plane transverse to the longitudinal direction, an arcuate profile; and
   the at least one flapper comprising a hinge tongue formed along a proximal edge thereof, the hinge tongue extending in a straight line in a longitudinal direction along the proximal edge of the flapper from a first end to a second end, the hinge tongue having, in a plane transverse to the longitudinal direction, an arcuate profile which is complementary to that of the hinge groove, the hinge tongue being received within the hinge groove and rotatable therein to allow the flapper to rotate between its open position and its closed position, the hinge tongue having a thickness (T) which is smaller than a width (W) of the hinge groove such that the hinge tongue is received with a sliding fit within the hinge groove.

2. The check valve as claimed in claim 1, wherein the valve housing comprises a pair of valve openings and the valve comprises a pair of flappers each flapper associated with a valve opening, the hinge body being located between the valve openings.

3. The check valve as claimed in claim 1, wherein the hinge body further comprises at least one stop element projecting therefrom in a direction away from the valve opening, the flapper engaging the stop element in its open position.

4. The check valve as claimed in claim 3 wherein the hinge body comprises a pair of stop elements projecting therefrom, the stop elements diverging from one another in the direction away from the valve opening.

5. The check valve as claimed in claim 3, wherein the stop element or elements is/are planar elements.

6. A check valve as claimed in claim 5, wherein openings are provided through the stop element(s).

7. A check valve as claimed in claim 1, wherein the hinge body is formed integrally with the valve housing, or formed separately therefrom and mounted thereto.

8. A check valve as claimed in claim 1, wherein the valve body and the flapper are extruded.

9. A check valve as claimed in claim 1, comprising retaining elements mounted at the first and second ends of the hinge body to retain the hinge tongue in the hinge groove.

10. A check valve as claimed in claim 1, wherein the hinge groove and hinge tongue are configured such that a clearance is provided between an end of the flapper hinge tongue 16 and an end surface of the hinge groove when the hinge tongue is in a closed position.

11. A check valve comprising:

a valve housing defining at least one valve opening; and at least one flapper pivotably mounted for rotation relative to the valve housing between an open position in which it permits fluid flow through the respective valve opening and a closed position in which it prevents fluid flow through the valve opening;

the valve housing comprising a hinge body, the hinge body comprising a hinge groove extending in a straight line in a longitudinal direction therethrough from a first end to a second end, the hinge groove having, in a plane transverse to the longitudinal direction, an arcuate profile; and the at least one flapper comprising a hinge tongue formed along a proximal edge thereof, the hinge tongue extending in a straight line in a longitudinal direction along the proximal edge of the flapper from a first end to a second end, the hinge tongue having, in a plane transverse to the longitudinal direction, an arcuate profile which is complementary to that of the hinge groove, the hinge tongue being received within the hinge groove and rotatable therein to allow the flapper to rotate between its open position and its closed position, wherein the hinge groove is enlarged at an end relative to the width (W) of a remainder of the hinge groove.

12. A method of manufacturing a check valve housing for a check valve as claimed in claim 1, comprising:

extruding a single element having a base portion for forming the at least one valve opening therein and a hinge portion extending therefrom for forming the hinge body and containing the hinge groove; and forming the at least one valve opening through the base portion.

13. A method of manufacturing a flapper for a check valve as claimed in claim 1, comprising extruding the flapper with the hinge tongue formed therein.

14. A method of manufacturing a check valve housing as claimed in claim 12, further comprising machining the valve housing and/or the flapper to a final shape.

\* \* \* \* \*